(12) United States Patent
Suzuki

(10) Patent No.: US 6,929,464 B2
(45) Date of Patent: Aug. 16, 2005

(54) INJECTION MOLD AND INJECTION MOLD PIN

(75) Inventor: Tadao Suzuki, Chiba (JP)

(73) Assignee: Futuba Corporation, Chiba (JP)

(*) Notice: Subject to any disclaimer, the term of this patent is extended or adjusted under 35 U.S.C. 154(b) by 183 days.

(21) Appl. No.: 10/390,618

(22) Filed: Mar. 19, 2003

(65) Prior Publication Data
US 2004/0022885 A1 Feb. 5, 2004

(30) Foreign Application Priority Data
Mar. 20, 2002 (JP) .................................... 2002-078663

(51) Int. Cl.[7] .............................................. B29C 45/40

(52) U.S. Cl. .................. 425/556; 264/334; 425/444; 425/812

(58) Field of Search .............................. 425/444, 556, 425/168, 812

(56) References Cited

U.S. PATENT DOCUMENTS 5,511,967 A * 4/1996 Berdan ...................... 425/556
6,345,974 B1 * 2/2002 Kawasaki et al. .......... 425/556
6,575,730 B2 * 6/2003 Muller ........................ 425/556

FOREIGN PATENT DOCUMENTS

JP          5-261765       * 10/1993

* cited by examiner

Primary Examiner—Tim Heitbrink
(74) Attorney, Agent, or Firm—Bacon & Thomas

(57) ABSTRACT

An ejector pin of an injection mold includes a sleeve, a valve structure, and a biasing member. The sleeve has a passage hole and an enlarged hollow portion, which communicate with each other via a stepped portion engaged therebetween. The valve structure has a valve portion and a collar portion, which are disposed in the sleeve. The collar portion of the valve structure is biased by the biasing member such as a spring and stopped by the stepped portion. Gaps interposed between the valve structure and the sleeve serve as a gas passageway through which gas in a molding cavity is exhausted by a vacuum pump.

9 Claims, 9 Drawing Sheets

INJECTION MOLD AND INJECTION MOLD PIN

FIELD OF THE INVENTION

The present invention relates to an injection mold and a multi-functional pin such as an ejector pin for use therein; and, more particularly, to an injection mold pin having a gas-exhausting structure for exhausting gas out of an injection mold, and the injection mold employing same.

BACKGROUND OF THE INVENTION

FIG. 7 illustrates a cross sectional view of a conventional injection mold and FIG. 8 is a cross sectional view taken along a line "VIII—VIII" of FIG. 7.

There is shown a fixed mounting plate 1, which is fixedly attached to a fixing part of an injection molding apparatus (not shown), and a fixed mold plate 2 fixedly attached to the fixed mounting plate 1. A movable mounting plate 3 is fixedly attached to a moving part of the injection molding apparatus and a movable mold plate 5 is fixedly attached to the movable mounting plate 3 with a spacer block 4 engaged therebetween. The fixed mold plate 2 and the movable mold plate 5, facing each other, can be tightly pushed against each other to be put into a closed position, thereby defining therebetween a molding cavity 6 into which a molding material used for forming an article is filled.

The movable mold plate 5 is fixedly coupled with a guide post 7, which can be slidably inserted into a guide bush 8 of the fixed mold plate 2. The guide post 7 and the guide bush 8 help the movable mold plate 5 maintain itself parallel to the fixed mold plate 2 while the moving part of the injection molding apparatus makes the movable mold plate 5 move along an axial direction of the guide post 7 for the open position or the closed position.

A first ejector plate 10 and a second ejector plate 11 are movably disposed between the movable mounting plate 3 and the movable mold plate 5 under the guidance of a return pin 9. One or more ejector pins 12 are disposed at the first and the second ejector plate 10 and 11. Each of the ejector pins 12 is slidably inserted into the movable mold plate 5 through a corresponding through hole 13 that communicates with the molding cavity 6, wherein a front end of each of the ejector pins 12 can be selectively pushed into or pulled back out of the molding cavity 6.

For the closed position, the first and the second ejector plate 10 and 11 are moved away from the movable mold plate 5 and each of the ejector pins 12 is pulled back from the molding cavity 6. For an open position, the first and the second ejector plate 10 and 11 are moved close to the movable mold plate 5 and each of the ejector pins 12 is pushed into the molding cavity 6 to extrude a molded article therefrom.

When a molding material such as a molten resin is injected into the aforementioned injection mold, gas may be generated or volatilized therefrom. The gas would regenerate a deposited residue on an inner surface of the mold, i.e., in the molding cavity, thereby forming an undesirable blow-hole on a molded product. As a result, a previously deposited resin on the inner surface of the mold may prevent the molding cavity 6 from being sufficiently filled by the molten resin, thereby making the molded product have an incomplete feature.

To solve the aforementioned problem, some of conventional injection molds have employed a gas-exhausting structure for exhausting gas from the cavity, as shown in FIG. 8. That is to say, a venting portion 15 containing a porous material is disposed opposite to a gate 14 of a molding cavity 6 and a gas-exhausting portion 16 that opens to an exterior space communicates with the venting portion 15. Because the molding cavity 6 communicates with the gas-exhausting portion 16 via the venting portion 15, gas present in the molding cavity 6 can be exhausted to the exterior space via the venting portion 15 and the gas-exhausting portion 16.

Since, however, the above-described structure is not suitable for sufficiently exhausting gas in the cavity out of the mold, resin is still deposited on the inner surface of the mold. Further, the venting portion of the aforementioned structure would be inevitably problematically choked up with the deposited resin.

Accordingly, a prior art injection mold employing a gas-exhausting mechanism shown in FIG. 9 has been developed. There is shown a gas passageway 17 formed through a movable mold plate 5, which defines a molding cavity 6 with respect to a fixed mold plate 2. A rod-shaped valve structure 18 is slidably provided in the gas passageway 17 and a spring 19 is disposed therein under the valve structure 18. Attached on an opposite surface of the fixed mold plate 5 is a fixing plate 20. The gas passageway 17 is hermetically extended along an inner surface of the fixing plate 20 and is opened through a side of the fixed mold plate 5 to communicate with an exterior space.

As a molten resin is introduced into the molding cavity 6 in the above-described configuration, gas in the molding cavity 6 is exhausted to the exterior space via the gas passageway 17 that is opened for the time. The exhaustion of gas proceeds until the gas passageway 17 is blocked by the valve structure 18 that is lowered due to pressure of the molten resin.

The aforementioned configuration, however, causes a very high price of the injection mold because of the exclusive built-in gas-exhausting structure for exhausting gas out of the molding cavity 6. Further, when the exhaustion is forcibly performed by using an external suctioning device that would be connected with the gas passageway 17, a sealing member such as an O-ring is to be prepared between the fixing plate 20 and the fixed mold plate 5. Such an additional part complicates the injection mold configuration and, therefore, price thereof is further increased while the durability thereof may be decreased.

SUMMARY OF THE INVENTION

It is, therefore, an object of the present invention to provide an injection mold pin having a gas-exhausting structure that can reliably exhaust gas out of an injection mold and the injection mold employing same, wherein the injection mold pin, having a small size and an improved durability, can be simply assembled to the injection mold.

In accordance with a preferred embodiment of the present invention, there is provided an injection mold including: a first mold half and a second mold half for moving relative to each other between an open position and a closed position, wherein the first and the second mold half define a molding cavity in which a molding material used for molding a product is filled at the closed position; and a pin that selectively reaches the molding cavity, the pin including a sleeve being provided with a passage hole formed therethrough with an opened upper end; an enlarged hollow portion communicating with a lower end of the passage hole via a stepped portion engaged therebetween; and an exhaust hole opened to the enlarged hollow portion; a valve structure having a rod-shaped valve portion being slidably arranged in the passage hole of the sleeve with a gas passageway interposed therebetween, gas in the molding cavity being exhausted through the gas passageway; and a collar portion connected with the valve portion, the collar portion being movably arranged in the enlarged hollow portion of the sleeve, wherein the gas passageway is selectively opened or closed by the valve structure that moves between a top dead point and a bottom dead point, the top dead point being where the collar portion is stopped by the stepped portion; and a biasing means for biasing the valve structure toward the top dead point.

In accordance with another preferred embodiment of the present invention, there is provided an injection mold pin for use in an injection mold having a first mold half and a second mold half for moving relative to each other between an open position and a closed position, wherein the first and the second mold half define a molding cavity in which a molding material used for molding a product is filled at the closed position, the pin including: a sleeve being provided with a passage hole formed therethrough with an opened upper end; an enlarged hollow portion communicating with a lower end of the passage hole via a stepped portion engaged therebetween; and an exhaust hole opened to the enlarged hollow portion; a valve structure having a rod-shaped valve portion being slidably arranged in the passage hole of the sleeve with a gas passageway interposed therebetween, gas in the molding cavity being exhausted through the gas passageway; and a collar portion connected with the valve portion, the collar portion being movably arranged in the enlarged hollow portion of the sleeve, wherein the gas passageway is selectively opened or closed by the valve structure that moves between a top dead point and a bottom dead point, the top dead point being where the collar portion is stopped by the stepped portion; and a biasing means for biasing the valve structure toward the top dead point.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENT

Figure 1:
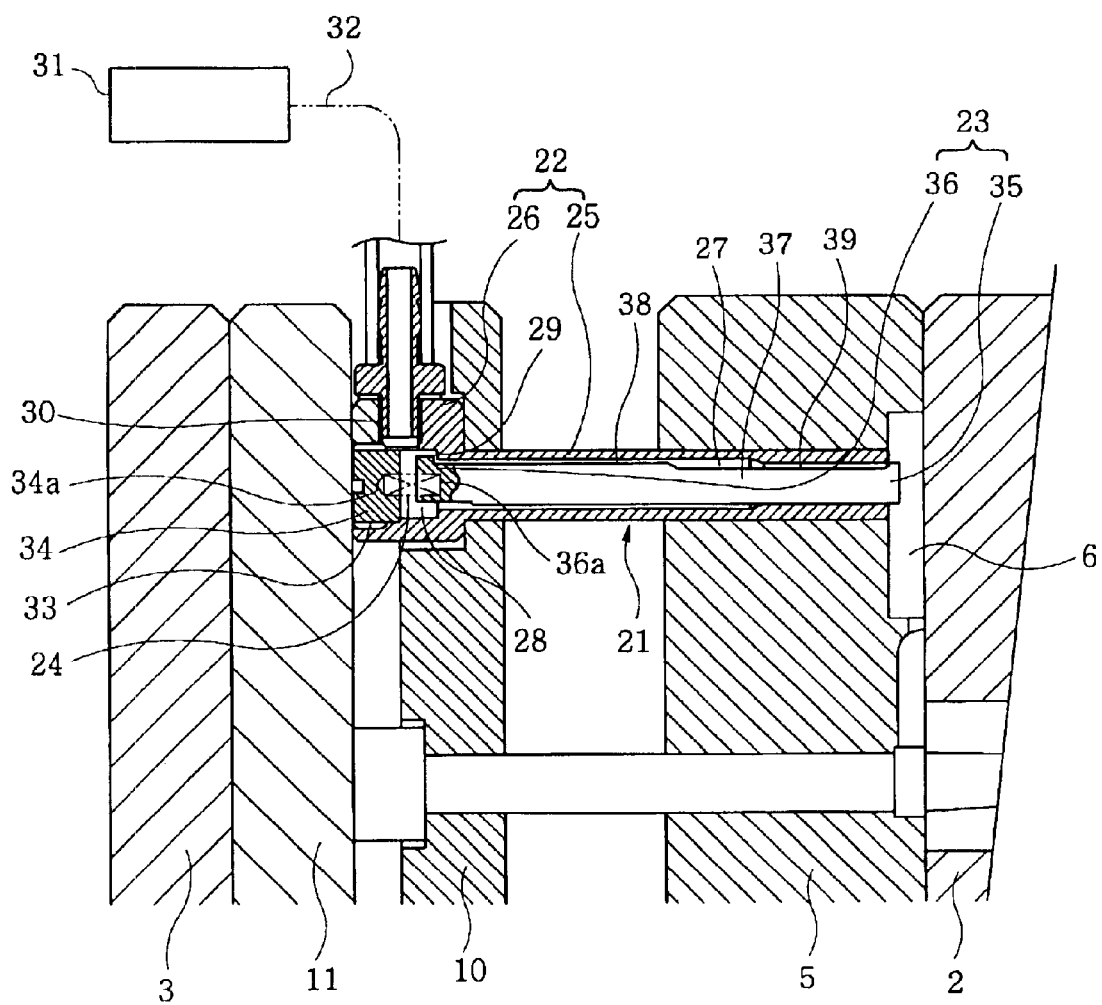
FIG. 1 illustrates a cross sectional view of a first preferred embodiment of the present invention.

Referring now to FIGS. 1 to 6C, an injection mold and an injection mold pin in accordance with preferred embodiments of the present invention will be described in detail. A like numeral represents a like part in the drawings.

Figure 7:
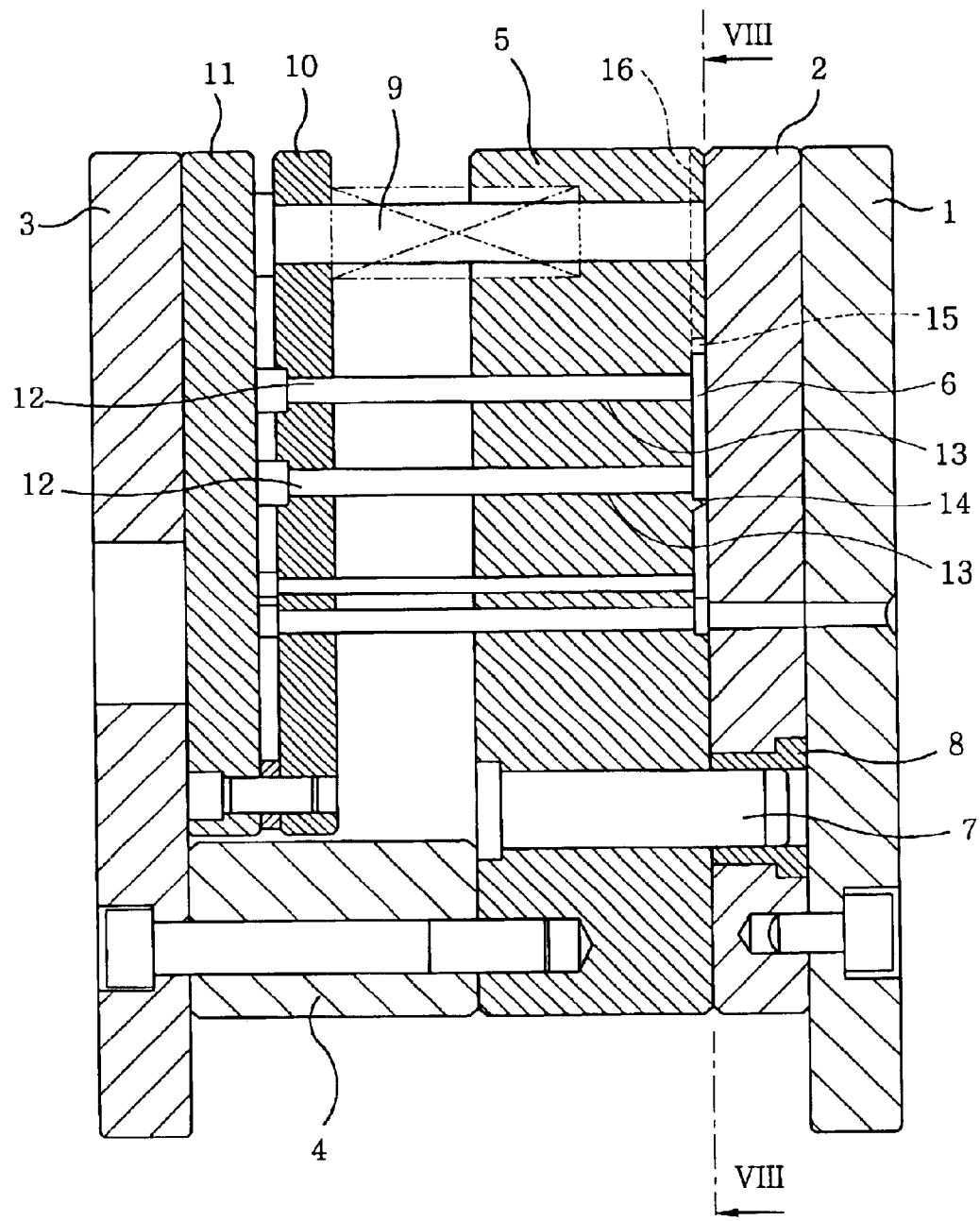
FIG. 7 is a cross sectional view of a conventional injection mold.
Figure 8:
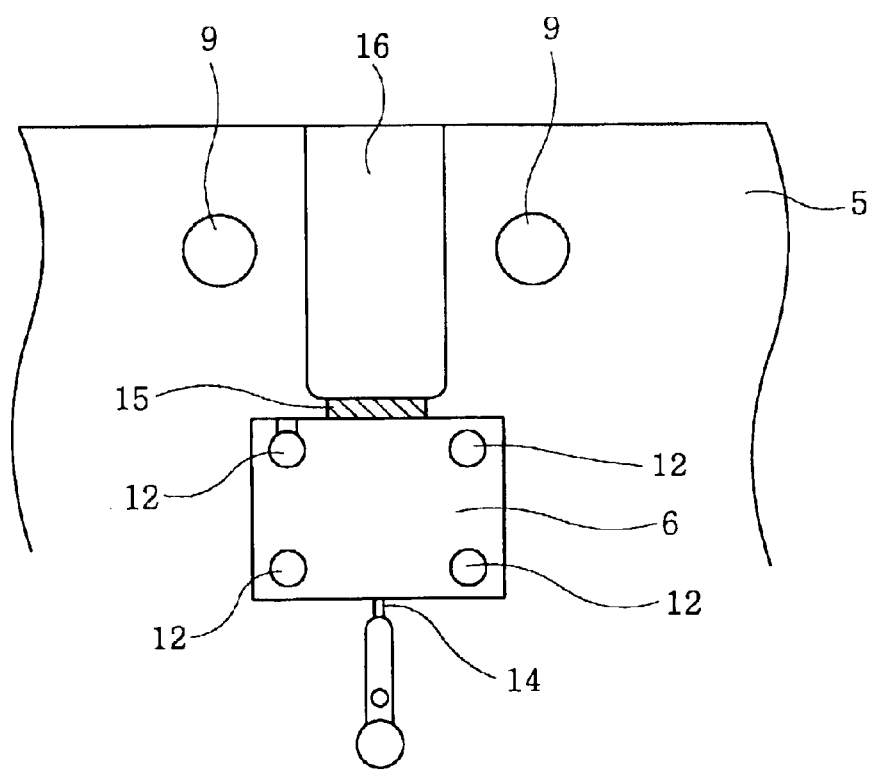
FIG. 8 provides a partial cross sectional view taken along a line "VIII—VIII" of FIG. 7.
Figure 9:
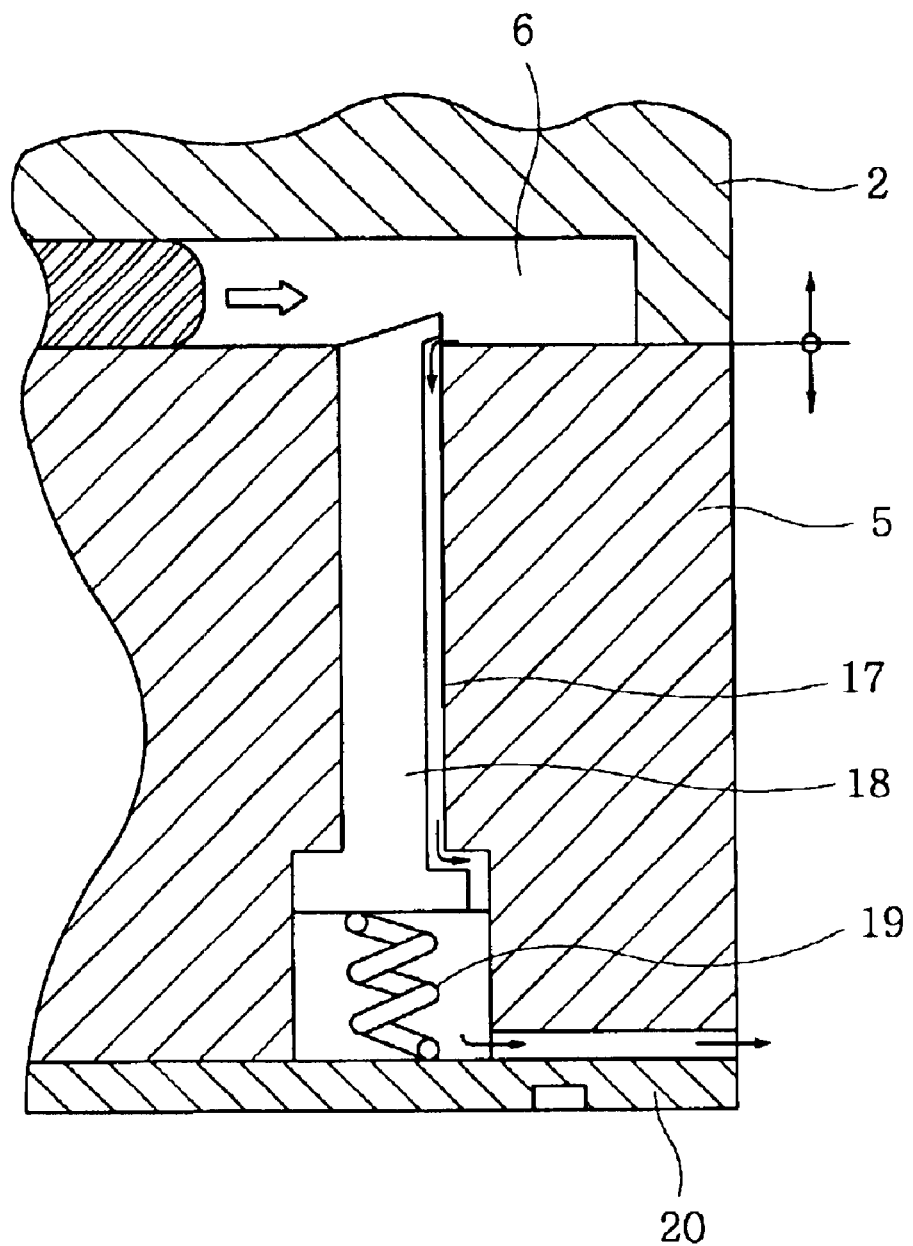
FIG. 9 depicts a cross sectional view of a gas-exhausting structure employed by a prior art injection mold.

A basic configuration of the injection mold in accordance with a preferred embodiment of the present invention is generally similar to that of the prior art injection mold described with reference to FIG. 7. A characteristic feature of the preferred embodiment of the present invention is found in a multi-functional pin such as an ejector pin that has a gas passageway formed therein for exhausting gas in a cavity out of the mold, the gas passageway being connected with a vacuum suction device. Accordingly, a general illustration of the injection mold is omitted in the following explanation for the purpose of simplicity while a partial cross sectional view of illustrating a corresponding functional pin and a periphery thereof is mainly referred to therein. Further, the pins in accordance with the present invention are not limited to the ejector pin but include a core pin that lacks the function of ejecting a molded product.

FIG. 1 is a cross sectional view illustrating an ejector pin 21 of an injection mold in accordance with a first preferred embodiment of the present invention. The ejector pin 21 is fixedly attached to a first or an upper ejector plate 10 and slidably passes through a movable mold plate 5, an end portion thereof being directed to inside of a molding cavity 6. Hereinafter, a fixed mold plate 2 and a movable mounting plate 3 will be respectively referred to as an upper side and a lower side of the injection mold for the sake of convenience.

The ejector pin 21 includes a sleeve 22, a valve structure 23 disposed therein, and a spring 24 also disposed therein. The spring 24 in the sleeve 22 serves as a biasing member for biasing the valve structure 23 toward the molding cavity 6.

In detail, the sleeve 22 has a cylinder portion 25 and a flange portion 26 disposed on a lower end of the cylinder portion 25. The flange portion 26 is attached to the upper ejector plate 10 while the cylinder portion 25 is inserted therethrough. The cylinder portion 25 slidably passes through a movable mold plate 5 such that a front end edge thereof is directed to the molding cavity 6.

The cylinder portion 25 has a passage hole 27, which is provided therethrough and opened to the molding cavity 6 at its upper end. The passage hole 27 is generally divided into two, a lower part and an upper part. The flange portion 26 has therein an enlarged hollow portion 28, which is hollow and communicates with a lower end portion of the passage hole 27. The upper and the lower part of the passage hole 27 and the enlarged hollow portion 28 can be preferably made to have circular cross sections when viewed along the length direction of the cylinder portion 25. Since the enlarged hollow portion 28 has an inner diameter greater than that of the lower part of the passage hole 27, a stepped portion 29 is engaged therebetween. The inner diameter of the passage hole 27 is smaller at the upper part thereof than at the lower part thereof. That is to say, the sleeve 22 has the smallest inner diameter at the upper end of the cylinder portion 25. However, it should be noted that the cross sections of the passage hole 27 and the enlarged hollow portion 28 can have other shapes than the circular shape. In such a case, the cross sectional area of the lower part of the passage hole 27 is smaller than that of the enlarged hollow portion 28 but is greater than that of the upper part of the passage hole 27.

The enlarged hollow portion 28 communicates with an exhaust hole 30 formed through a side surface of the flange portion 26. The exhaust hole 30 is connected with an external vacuum pump 31 via a pipe line 32.

The enlarged hollow portion 28 further communicates with an internally threaded hole 33 that is drilled through a rear surface of the flange portion 26. An inner diameter of the threaded hole 33 is large enough for the valve structure 23 to pass therethrough. Accordingly, the valve structure 23 can be inserted into the sleeve 22 through the threaded hole 33. A screw type covering member 34 is detachably provided in the threaded hole 33.

The valve structure 23 inserted in the sleeve 22 has a rod-shaped valve portion 35 and a collar portion 36 connected with a lower end of the valve portion 35. The rod-shaped valve portion 35 is slidably inserted into the passage hole 27 of the sleeve 22 while the collar portion 36 is movably disposed in the enlarged hollow portion 28.

The spring 24 for biasing the valve structure 23 toward the cavity 6 is mounted between recesses 36a and 34a formed into the collar portion 36 and the covering member 34, respectively, in the enlarged hollow portion 28. In this preferred embodiment, a screw-coupled length of the covering member 34 with respect to the flange portion 26 is structurally restricted so that the covering member 34 has a predetermined position, which makes the spring 24 exert a desired pressure on the valve structure 23; makes the valve structure 23 have a designated position in the sleeve 22; and determines a bottom dead point of the valve structure 23. In this preferred embodiment, the spring 24 biases the valve structure 23 until the collar portion 36 thereof is stopped by the stepped portion 29 of the enlarged hollow portion 28. That is to say, the valve structure 23 is capable of moving axially against the pressure exerted by the spring 24 between a top dead point and the bottom dead point. The collar portion 36 is stopped by the stepped portion 29 at the top dead point. Upper edges of the valve portion 35 and the cylinder portion 25 are set to be on a substantially same plane at the bottom dead point.

In this preferred embodiment, the rod-shaped valve portion 35 has a substantially constant outer diameter, which is approximately equal to an inner diameter of the upper part of the passage hole 27 and is smaller than that of the lower part thereof. Further, the rod-shaped valve portion 35 is provided with a cutaway portion 37 notched partially on a circumferential surface formed in an axial direction thereof at an upper portion thereof. Accordingly, an annular cross-sectional space that serves as a first gas passageway 38 is defined between an overall outer circumferential surface of the rod-shaped valve portion 35 and an inner circumferential surface of the lower part of the passage hole 27 having the larger diameter. A generally semicircular cross-sectional space that serves as a second gas passageway 39 is axially defined between the flat cutaway portion 37 of the rod-shaped valve portion 35 and the inner circumferential surface of the upper part of the passage hole 27 having the smaller diameter. Herein, because the outer diameter of the rod-shaped valve portion 35 and the inner diameter of the upper part of the passage hole 27 are almost identical, there is no other considerable gap therebetween than the semicircular cross-sectional space. Accordingly, an inner space of the molding cavity 6 communicates with the enlarged hollow portion 28 via the second gas passageway 39 and the first gas passageway 38 and is further connected with the external vacuum pump 31 via the exhaust hole 30 and the pipe line 32.

Since a cavity-side opening of the second gas passageway 39 is open to the molding cavity 6 only at a specific circumferential part of the valve portion 35, a gas suction direction by the second gas passageway 39 depends on a rotation angle of the valve structure 23 with respect to the sleeve 22. Accordingly, when the ejector pin 21 is assembled to the injection mold, an angular position of the sleeve 22 is preferably determined such that the cavity-side opening of the second gas passageway 39 is directed with respect to the molding cavity 6 as desired. That is to say, a rotation stopper is prepared to stop the rotation of the valve structure 23 against the sleeve 22, thereby obtaining a desirable opening direction of the second gas passageway 39 with respect to the molding cavity 6, as will be described later.

Next, the operation of the ejector pin 21 having the gas-exhausting structure will be explained in case of using the aforementioned injection mold for a molding process.

As shown in FIG. 1, the valve structure 23 is located at the top dead point and the second gas passageway 39 is opened to the molding cavity 6. As a molten resin is introduced into the molding cavity 6, the vacuum pump 31 removes the gas out of the molding cavity 6 through the exhaust hole 30 via the second gas passageway 39 and the first gas passageway 38.

The molten resin puts pressure on the valve portion 35 as it proceeds to fill the molding cavity 6, so that the upper end of the valve portion 35 is embedded into the passage hole 27 to close the second gas passageway 39. The cutaway portion 37 is not formed on the upper end of the value portion 35, as shown in FIG. 1. Resultantly, the molten resin hardly shows any tendency of penetrating into the second gas passageway 39.

After the molding is completed, a pair of mold plates 2 and 5 are opened while ejector plates 10 and 11 are transferred toward a movable mold plate 5 such that the ejector pin 21 is moved in a direction of passing through the movable mold plate 5.

Figure 2:
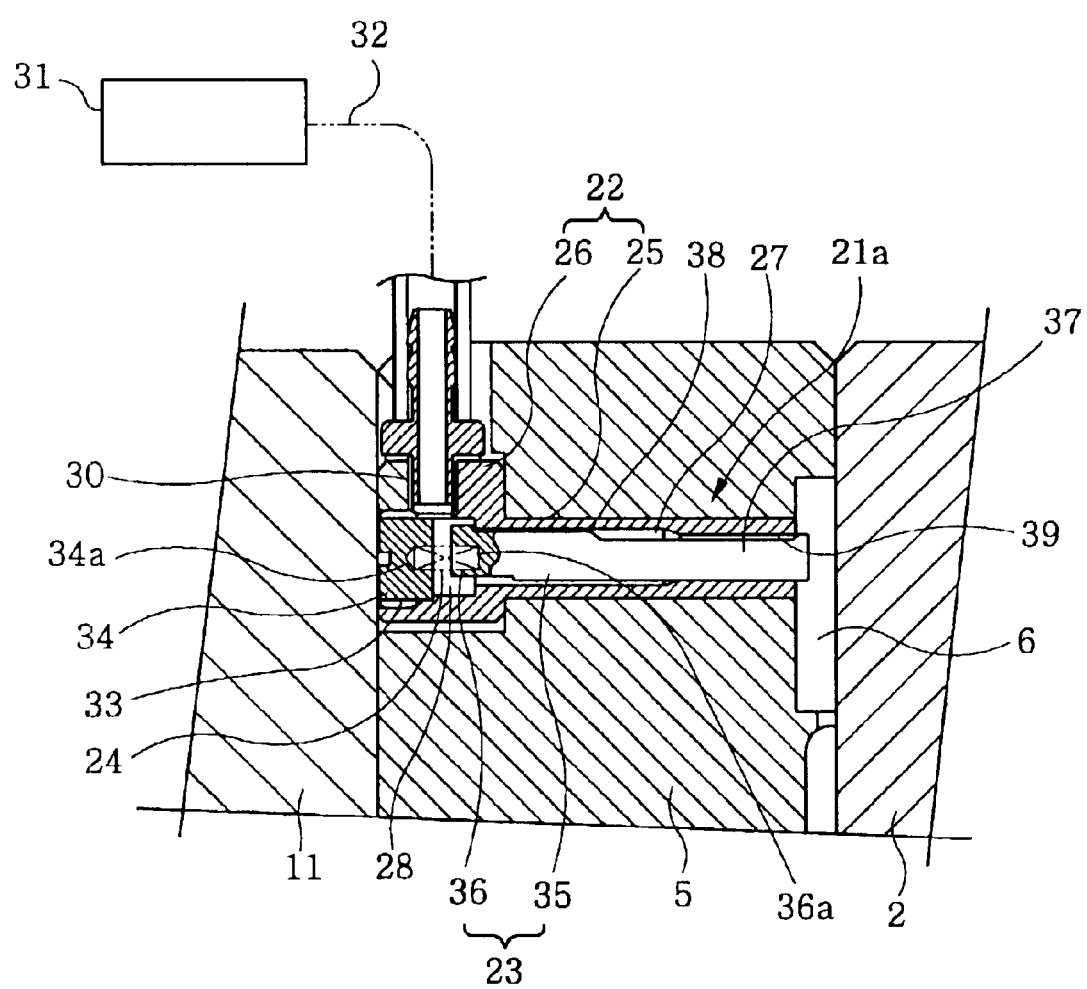
FIG. 2 provides a cross sectional view of a second preferred embodiment of the present invention.

FIG. 2 is a cross sectional view illustrating a periphery of a core pin 21a of an injection mold in accordance with a second preferred embodiment of the present invention. The core pin 21a is fixedly attached to a movable mold plate 5 to pass therethrough such that a leading end thereof is directed to inside of a molding cavity 6. The core pin 21a has a substantially same configuration as that of the first preferred embodiment.

Figure 3:
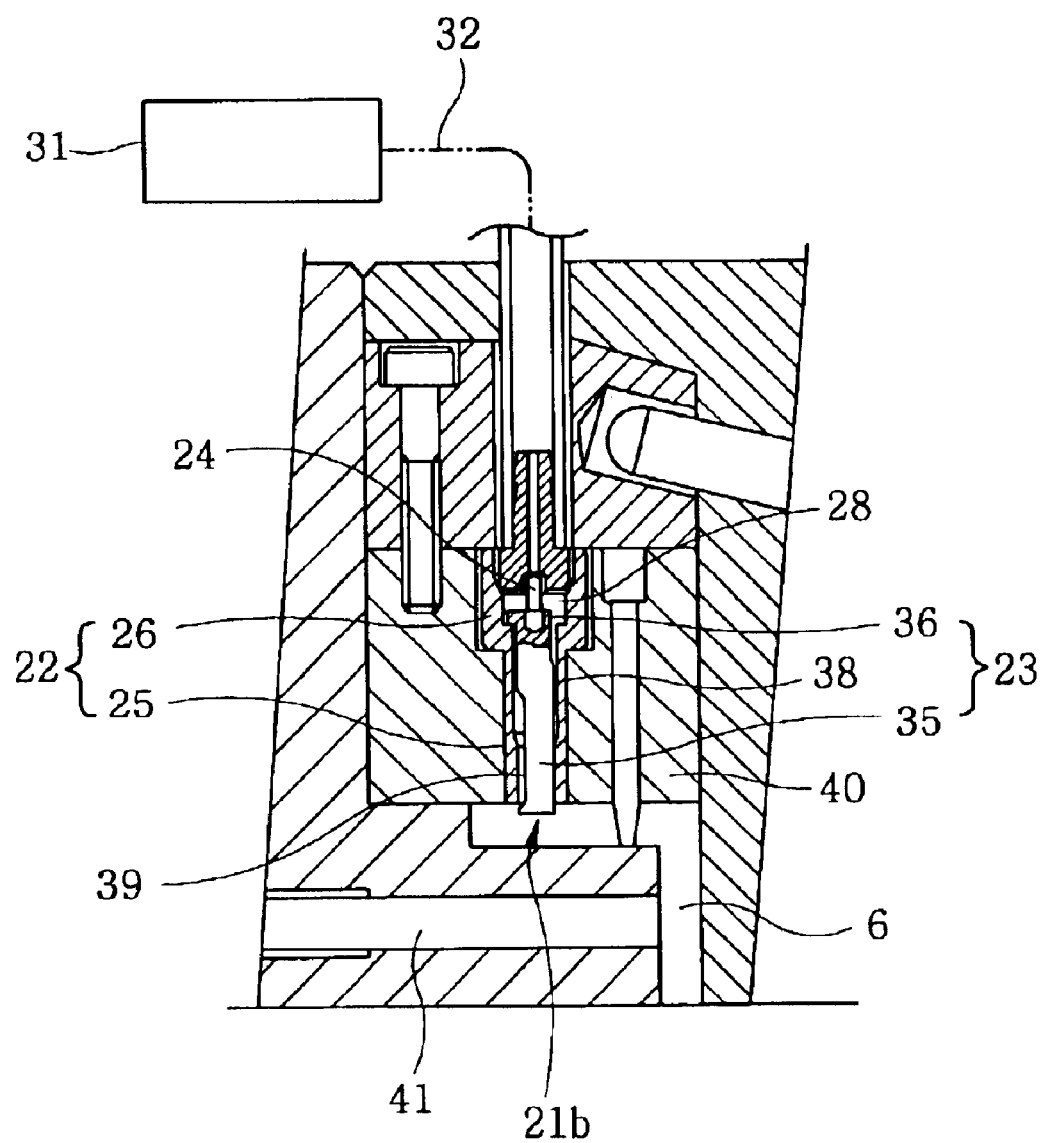
FIG. 3 gives a cross sectional view of a third preferred embodiment of the present invention.

FIG. 3 is a cross sectional view illustrating a periphery of a slide core 40 of an injection mold that employs therein a pin 21b in accordance a third preferred embodiment of the present invention. The pin 21b is attached to the slide core 40 and a front end thereof is directed to a molding cavity 6. An ejector pin 41 is separately installed in the injection mold. The pin 21b has a substantially same configuration as that of the first preferred embodiment.

Figure 4A:
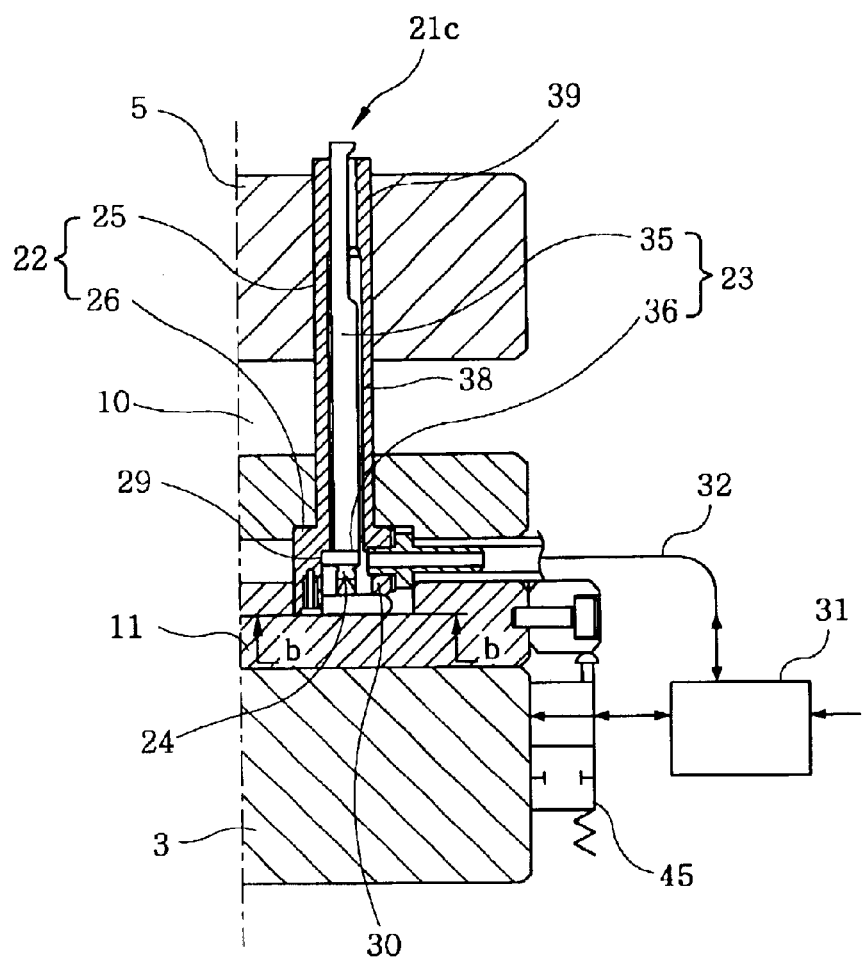
FIG. 4A sets forth a cross sectional view of a fourth preferred embodiment of the present invention.
Figure 4B:
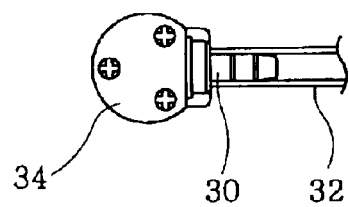
FIG. 4B depicts a cross sectional view taken along a line "b—b" of FIG. 4A.

FIGS. 4A and 4B, being related to a fourth preferred embodiment of the present invention, illustrate an injection mold that employs an ejector pin 21c that is used as in the first preferred embodiment. In the first preferred embodiment, the exhaust hole 30 that communicates with the first and the second gas passageway 38 and 39 is connected with the vacuum pump 31 via the pipe line 32 and only the suction can be performed by the vacuum pump 31 to exhaust gas out of the molding cavity 6. In the fourth preferred embodiment, however, a switching valve 45 is further employed for a vacuum pump 31 connected with an exhaust hole 30 such that suction and supply of gas can be selectively performed with respect to gas passageways 38 and 39. The suction is performed to exhaust gas in a molding cavity 6 out of the mold, as explained in the first preferred embodiment. The supply of gas is performed to inject a compressed air into the molding cavity 6 while the ejector pin 21c is pushed thereinto to extrude a molded product under an opening process of the mold plates, thereby blowing away particles such as residues of resin present in the molding cavity 6 or at an opening of the gas passageway 39.

Figure 5A:
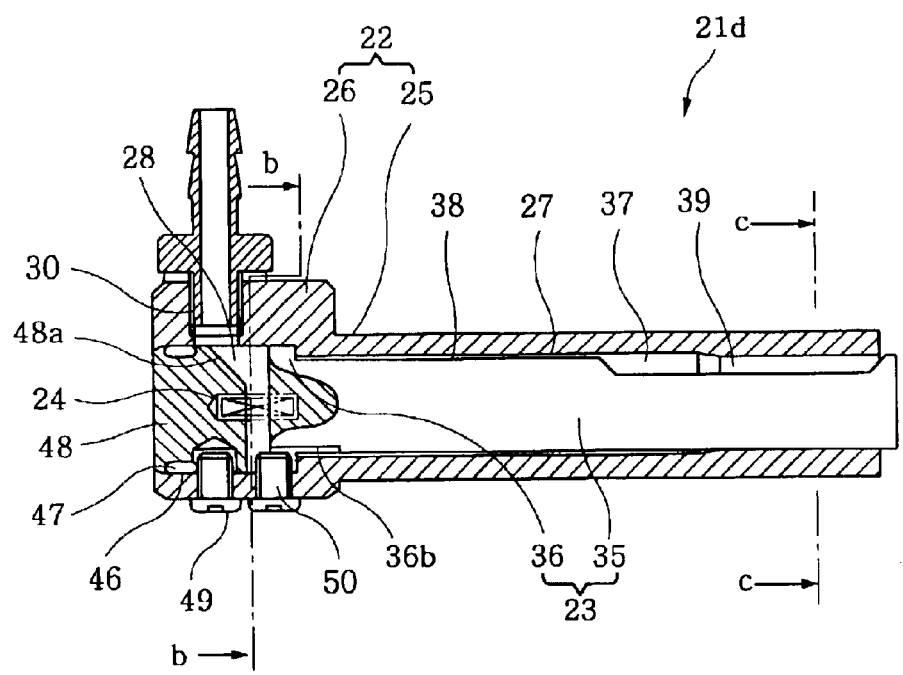
FIG. 5A shows a cross sectional view of a fifth preferred embodiment of the present invention.
Figure 5B:
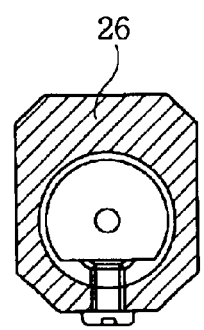
FIGS. 5B and 5C offer cross sectional views taken along lines "b—b" and "c—c" of FIG. 5A, respectively.
Figure 5C:
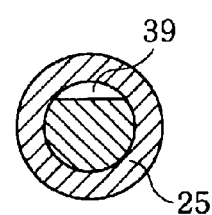

FIGS. 5A to 5C, being related to a fifth preferred embodiment of the present invention, illustrate an ejector pin 21d that can be employed in an injection mold. The ejector pin 21d has a substantially same configuration as that of the first preferred embodiment except for a structure for covering the opening on the rear surface of a flange portion 26 of a sleeve 22. Though the threaded hole 33 and the screw type covering member 34 are employed in the first preferred embodiment for covering the aforementioned opening, a hole 46 and a covering member 48 are employed in this preferred embodiment for the same purpose. That is to say, after the covering member 48 is inserted into the hole 46 with a sealing member 47, a set screw 49 is screwed through the side surface of a flange portion 26 to fasten the covering member 48. Further, the covering member 48 has an angled cutaway portion 48a, which serves to prevent an exhaust hole 30 from being blocked and secure a smooth gas passageway in an enlarged hollow portion 28. This preferred embodiment is further provided with a rotation stopper. That is to say, a notch portion 36b is formed on a collar portion 36 of a valve structure 23 along the axial direction thereof and a set screw 50 is screwed into near the notch portion 36b through the side surface of the flange portion 26 of a sleeve 22, so that the valve structure 23 can be prevented from rotating in the sleeve 22 while being still capable of moving in an axial direction thereof.

Figure 6A:
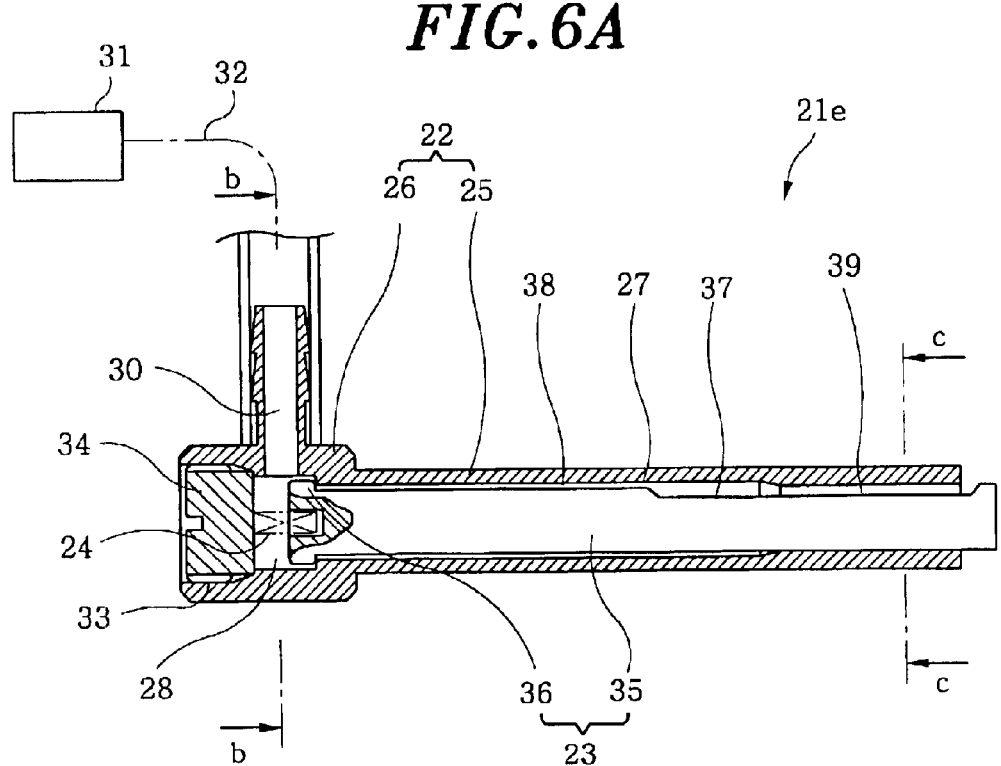
FIG. 6A shows a cross sectional view of a sixth preferred embodiment of the present invention.
Figure 6B:
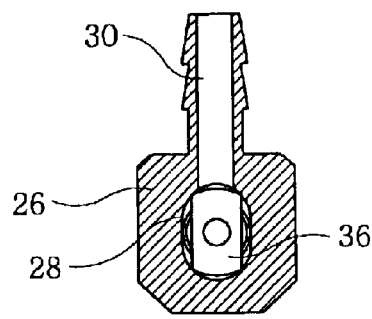
FIGS. 6B and 6C offer cross sectional views taken along lines "b—b" and "c—c" of FIG. 6A, respectively.
Figure 6C:
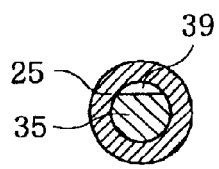

FIGS. 6A to 6C, being related to a sixth preferred embodiment of the present invention, illustrate an ejector pin 21e that can be employed by an injection mold. The ejector pin 21e has a substantially same configuration as that of the first preferred embodiment but has a rotation stopping structure that is different from that of the ejector pin 21d in accordance with the fifth preferred embodiment shown in FIG. 5. That is to say, a valve portion 35 of a valve structure 23 is of a substantially round rod shape as shown in FIG. 6C while a collar portion 36 thereof is of a substantially rectangular shape and an enlarged hollow portion 28 of a flange portion 26 of a sleeve 22 in which the collar portion 36 is accommodated is correspondingly of a conformal rectangular inner shape. Accordingly, the collar portion 36 of the valve structure 23 cannot rotate in the enlarged hollow portion 28 of the flange portion 26 of the sleeve 22 while being capable of moving within a predetermined range in an axial direction.

When the valve structure 23 and the sleeve 22 are assembled together in this preferred embodiment, a gas passageway 39 may be set to have either a same opening direction as that of an exhaust hole 30 as shown in FIG. 6A or an alternative opening direction opposite thereto, wherein the latter case of adopting the alternative opening direction is not illustrated in the drawings. Accordingly, when the ejector pin 21e is assembled to the mold, it is preferred that the opening direction of the gas passageway 39 is determined in consideration of the direction of the flange portion 26 of the sleeve 22.

The present invention has following effects.

1) Since each of the pins in accordance with the respective preferred embodiments of the present invention has a compact structure in which the gas passageway is internally disposed, any additional process such as machining is rarely needed for installing the pin in a mold. Further, when the mold employs the pin as a specific ejector, the rod-shaped valve structure of the pin is subjected to a relatively small load and the pin can have a sufficient gas passageway for a high suction efficiency while being of a highly endurable structure against a high injection pressure, because only an injection pressure acts on the valve structure while pressure for ejecting a molded product acts on the sleeve only. Furthermore, even if gas leaks a little out of pipe lines connected with the pin, the suction effect of the pin does not change much and, therefore, the efficiency of suctioning gas remains high because the pin itself has a hermetically sealed built-in structure. As explained above, each of the pins in accordance with the respective preferred embodiments of the present invention is simple to assemble to an injection mold and easy to apply to an existing molding apparatus by using a later-performed processing. Further, the pin is of a small size and easy to repair or maintain while being capable of suctioning gas stably.

2) Further effects as follows are provided by the present invention.

a. Since gas volatilized from resin is exhausted out of the mold, a venting portion thereof can be prevented from being choked up with a deposited resin and a process for cleaning the deposited resin (such as a periodical dusting or an overhaul cleaning) can be omitted or at least simplified.

b. Any modification of the mold to prevent generation of burr or prepare a gas-exhausting structure can be omitted or at least simplified and, therefore, the period for fabricating the mold can be shortened.

c. Since gas in the molding cavity is exhausted out of the mold, generation of short shot can be prevented.

d. A transcription quality of the molding cavity can be improved.

e. Injection pressure can be lowered.

f. Pressure for clamping the mold plates can be lowered.

g. The lowered injection pressure makes it possible to reduce cost for fabricating the mold.

Still further effects as follows are provided by the present invention.

3) Since the exhaust hole is disposed through a side surface of the flange portion, pipe lines for exhausting gas can be prepared between various kinds of plates that constitute the mold and, therefore, the pin can be installed in the mold without applying an additional process such as machining to the mold.

4) Since the upper edge of the valve portion of the valve structure and that of the cylinder portion of the sleeve are set to be on a substantially same plane when the valve structure is positioned at the bottom dead point, the valve structure can be pulled back completely out of the molding cavity, so that a trace of the valve structure is rarely left on a molded product.

5) Since the cutaway portion is provided on a part of the circumferential surface of the upper part of the rod-shaped valve structure to define the gas passageway thereon and, further, the rotation stopper is prepared to stop rotation of the valve structure against the sleeve, the opening direction of the gas passageway toward the cavity can be controlled.

6) Since the passage hole of the sleeve is of the shape having a diameter larger at the lower part thereof than at the upper part thereof, the gas passageway can have a larger area at the lower part.

While the invention has been shown and described with respect to the preferred embodiment, it will be understood to those skilled in the art that various changes and modifications may be made without departing from the spirit and scope of the invention as defined in the following claims.

What is claimed is:

1. An injection mold comprising:

a first mold half and a second mold half for moving relative to each other between an open position and a closed position, wherein the first and the second mold half define a molding cavity in which a molding material used for molding a product is filled at the closed position; and a pin that selectively reaches the molding cavity, the pin including a sleeve being provided with a cylinder portion and a box-shaped flange portion provided on a lower edge of the cylinder portion, wherein a passage hole is formed through the cylinder portion with an opened upper end while a stepped portion, an enlarged hollow portion, and an exhaust hole opened to the enlarged hollow portion are provided in the flange portion, the enlarged hollow portion communicating with a lower end of the passage hole via the stepped portion engaged therebetween;

a valve structure having
      a rod-shaped valve portion being slidably arranged in the passage hole of the sleeve with a gas passageway interposed therebetween, gas in the molding cavity being exhausted through the gas passageway; and
      a collar portion connected with the valve portion, the collar portion being movably arranged in the enlarged hollow portion of the sleeve, wherein the gas passageway is selectively opened or closed by the valve structure that moves between a top dead point and a bottom dead point, the top dead point being where the collar portion is stopped by the stepped portion; and a biasing means for biasing the valve structure toward the top dead point.

2. The injection mold of claim 1, wherein a threaded hole that communicates with the enlarged hollow portion is provided through a lower part of the flange portion in order to allow the collar portion to pass therethrough, and a covering member is detachably provided in the threaded hole.

3. The injection mold of claim 1, wherein the exhaust hole is formed through a side part of the flange portion.

4. The injection mold of claim 1, wherein an upper edge of the valve portion of the valve structure and an upper edge of the cylinder portion of the sleeve are on a substantially same plane when the valve structure reaches the bottom dead point.

5. The injection mold of claim 1, wherein the valve portion is provided with a cutaway portion provided partially on a circumferential surface of an upper part thereof, so that the gas passageway is provided along a partial circumference of the upper part thereof; a stopping means is provided for preventing the valve structure from rotating against the sleeve; and the passage hole is set to open in a predetermined direction in the molding cavity when the pin is assembled to the injection mold.

6. The injection mold of claim 5, wherein the passage hole has an inner diameter greater at a lower portion thereof than that at an upper portion thereof, so that the gas passageway is provided along an overall circumference of a lower portion of the valve portion.

7. An injection mold pin for use in an injection mold having a first mold half and a second mold half for moving relative to each other between an open position and a closed position, wherein the first and the second mold half define a molding cavity in which a molding material used for molding a product is filled at the closed position, the pin comprising:

a sleeve being provided with a cylinder portion and a box-shaped flange portion provided on a lower edge of the cylinder portion, wherein a passage hole is formed through the cylinder portion with an opened upper end while a stepped portion, an enlarged hollow portion, and an exhaust hole opened to the enlarged hollow portion are provided in the flange portion, the enlarged hollow portion communicating with a lower end of the passage hole via the stepped portion engaged therebetween;

a valve structure having
      a rod-shaped valve portion being slidably arranged in the passage hole of the sleeve with a gas passageway interposed therebetween, gas in the molding cavity being exhausted through the gas passageway; and
      a collar portion connected with the valve portion, the collar portion being movably arranged in the enlarged hollow portion of the sleeve, wherein the gas passageway is selectively opened or closed by the valve structure that moves between a top dead point and a bottom dead point, the top dead point being where the collar portion is stopped by the stepped portion; and a biasing means for biasing the valve structure toward the top dead point.

8. The injection mold of claim 1, wherein the pin ejects a molded product from the molding cavity when the first and the second mold halves move to the open position.

9. The injection mold of claim 1, further comprising a vacuum pump connected to the exhaust hole for exhausting gas out of the molding cavity through the passage hole, the enlarged hollow portion and the exhaust hole, sequentially.

* * * * *